United States Patent [19]

Levi et al.

[11] Patent Number: 5,870,943

[45] Date of Patent: Feb. 16, 1999

[54] DEVICE PERMITTING USING, ON A COFFEE MAKING MACHINE, GROUND COFFEE OR PREPACKAGED CAKES OF COFFEE

[76] Inventors: Jean Pierre Levi, 4 Corniche Fleurie; Mario Levi, 90 avenue de la Lanterne, both of 06200 Nice, France

[21] Appl. No.: 913,151

[22] PCT Filed: Mar. 6, 1996

[86] PCT No.: PCT/FR96/00347

§ 371 Date: Sep. 8, 1997

§ 102(e) Date: Sep. 8, 1997

[87] PCT Pub. No.: WO96/27316

PCT Pub. Date: Sep. 12, 1996

[30] Foreign Application Priority Data

Mar. 6, 1995 [FR] France .................................. 95 02560

[51] Int. Cl.$^6$ .................................................. A47J 31/06
[52] U.S. Cl. .............................. 99/287; 99/295; 99/302 R
[58] Field of Search .............................. 99/279, 293, 295, 99/302 R, 287

[56] References Cited

U.S. PATENT DOCUMENTS

| 3,030,874 | 4/1962 | Flori ........................................... 99/295 |
| 4,253,385 | 3/1981 | Illy ........................................ 99/295 X |
| 4,565,121 | 1/1986 | Ohya et al. ........................... 99/293 X |
| 5,634,394 | 6/1997 | Cortese ...................................... 99/295 |

FOREIGN PATENT DOCUMENTS

| 070403 | 6/1982 | European Pat. Off. . |
| 555775 | 5/1993 | European Pat. Off. . |
| 573054 | 8/1931 | Germany . |

*Primary Examiner*—Reginald L. Alexander
*Attorney, Agent, or Firm*—Young & Thompson

[57] ABSTRACT

A ladle holder (20) comprises either a releasable spray packing member for ground coffee or a spray recess for pre-packaged coffee blocks, and a filter ladle (10) may be provided as required with either a ground coffee filter or a filter adaptor (70) for coffee blocks. In the latter case, the filter ladle (10) fits into a holder with an upper ejector pin (83) for ejecting used coffee blocks. The holder is hinged to one bearing pin (30) and, when fully inserted, engages an abutment under the other bearing pin (40) by means of a tab. The two bearing pins (30, 40) engage helical projections (11, 12) on the filter ladle (10) to form a bayonet-like attachment and position the filter ladle (10) in engagement with a ladle seal.

13 Claims, 5 Drawing Sheets

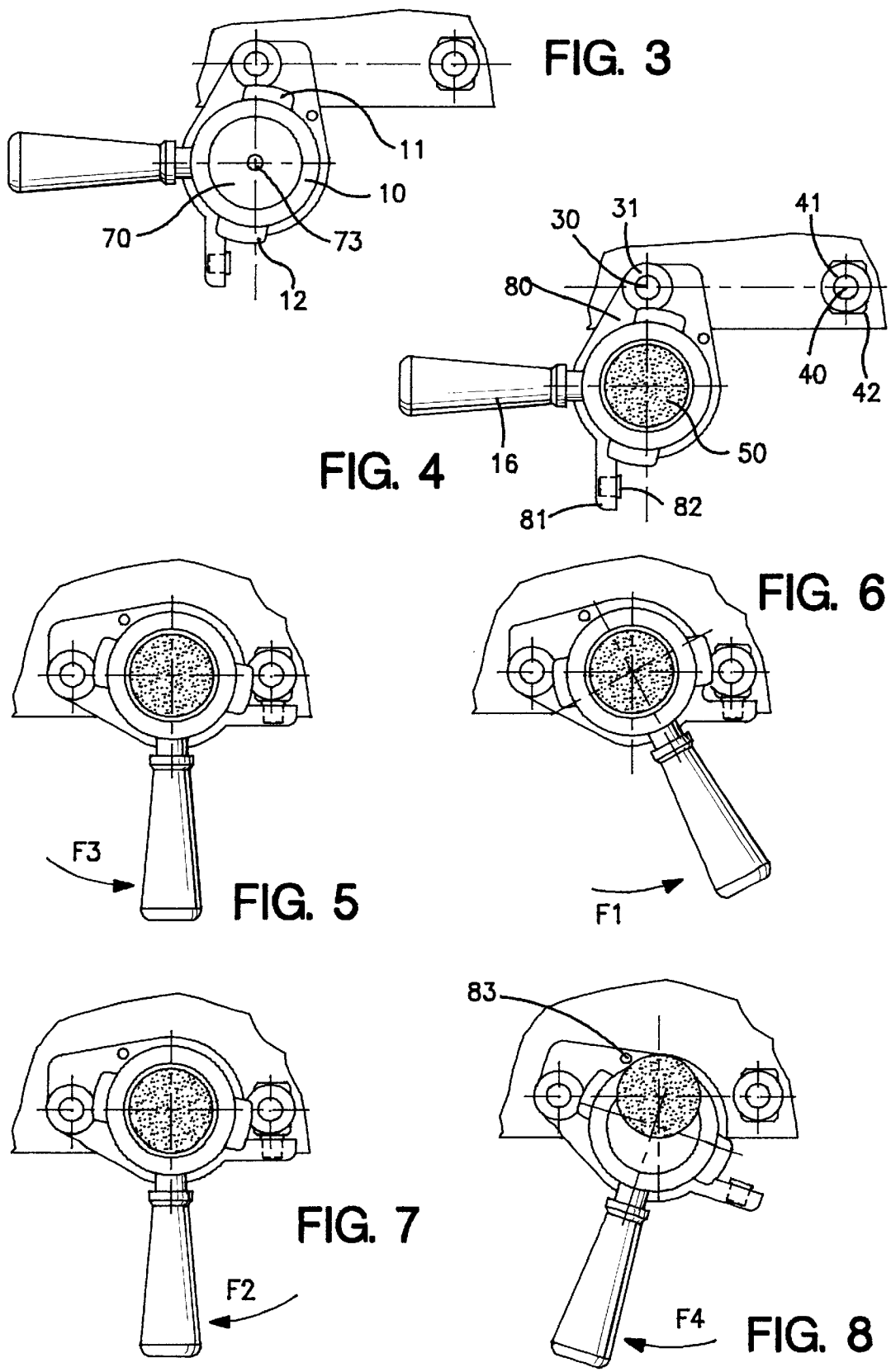

DEVICE PERMITTING USING, ON A COFFEE MAKING MACHINE, GROUND COFFEE OR PREPACKAGED CAKES OF COFFEE

FIELD OF THE INVENTION

The invention relates to a device permitting at will the use, on a coffee making machine provided for this purpose, of ground coffee or prepackaged cakes of coffee, as well as the removal of the used cakes of coffee.

BACKGROUND OF THE INVENTION

There exist at present on the market two kinds of coffee making machines, one using ground coffee, the other prepackaged cakes of coffee.

In the first case, the ground coffee is disposed in a filter of cylindrical shape, mounted on a filter-carrying cup, fixed pivotally in a bayonet system with helicoidal ramps, located below the cup carrier, whilst ensuring, at the end of the path of movement, the squeezing of a joint, called a cup joint, fitted below the cup carrier such that the hot water cannot escape laterally.

The document DE-A-573.054 has for its object a percolation device adapted to coact with an apparatus for the infusion of coffee by means of a connection, so as to prepare coffee-based beverages in small or large quantities; this device is characterized by the fact that a small or large dish, which comprises a sealed bell, is articulated relative to a pivot carried by the connection, itself provided with a sealing packing.

This earlier document defines the state of the art but is unsuitable for use with cakes containing coffee.

In the second case, on the other hand, the use of prepackaged cakes of coffee requires the use of a filter-carrying cup specially designed for this purpose. To obtain the infusion, the filter-carrying cup, on which the cake is disposed, is introduced into a cylindrical recess comprising throats in the form of helicoidal ramps, specially adapted to the filter-carrying cup. Each ramp is open and permits the introduction of the cup according to a limited angular position. The cake of coffee is encased between two sheets of paper, permeable to liquids, welded together forming a collar useful for gripping the cake of coffee after its infusion.

In known devices of this type, the collar of the prepackaged cake of coffee comprises an extra thickness and renders difficult the introduction of the filter-carrying cup into its cylindrical recess. When the infusion of the coffee is finished, and the filter-carrying cup is withdrawn from its recess, it often happens that the infused cake of coffee remains behind, because its edges bear against the walls of the cylindrical recess and in the helicoidal throats.

Under these circumstances, the user manually picks out the infused cake of coffee at the risk of burning himself, because the cylindrical recess is then at a temperature of about 90° C.

Solutions have been proposed to overcome these drawbacks, by using devices specially designed for this purpose.

There are already known different means permitting using a conventional coffee making machine for the infusion of cakes or tablets of prepackaged coffee, such as those described in the patents DE-A-573 054 and EP-A-0 070 403. An adapter, designed to be secured below the hot water dispenser of the machine, in place of the original filter-carrying cup, comprises at its base devices permitting the mounting by a bayonet system of a filter-carrying cup corresponding to that used in machines for prepackaged cakes of coffee.

Such a solution, which requires having recourse to the juxtaposition of subassemblies of different commercial origin, in addition to the fact that it does not facilitate the use of prepackaged cakes of coffee in conventional coffee machines, renders the latter less useful; and in addition it does not resolve the problem raised by the extraction after infusion of the cakes soaked with boiling water.

The document EP-A-0 555 775 provides a sliding system provided with a receptacle with a filter for an espresso coffee making machine, which comprises a cylindrical body with inclined annular surfaces, provided with a handle, the cylindrical body being adapted to turn to raise or lower itself on corresponding inclined surfaces of a structure of box shape. During raising, the cylindrical body raises the receptacle with its filter, without rotation, against a fixed structure, which it faces, said receptacle being thus subjected to a linear movement without rotation. The fixed structure is a toric joint, provided with a lower circular groove and an upper circular groove for better sealing, at the upper edge of the receptacle.

The system for raising or lowering the cylindrical body uses the coaction of several surfaces having inclined surfaces. In addition to problems of production and the cost of production, there is the possibility of very strong gripping during these rising and falling movements; moreover, the introduction of said cylindrical body into the box-shaped structure is not easy.

SUMMARY OF THE INVENTION

The present invention has for its object to overcome these drawbacks. This invention, as it is characterized, solves the problem consisting in creating a device permitting at will the use, in a coffee machine designed for this purpose, of ground coffee or prepackaged cakes of coffee, as well as the mechanical extraction of the infused cakes of coffee.

The device permitting using at will, in a coffee making machines, ground coffee or prepackaged cakes of coffee, as well as the mechanical extraction of the infused cakes of coffee, according to the invention, comprises a filter-carrying cup fixed below the cup carrier by means of a bayonet system constituted of helicoidal projections, diametrically opposed, located on the sides of the filter-carrying cup, and shouldered axles fixed below the cup carrier such as are described in French patent application No. 95/01961, is characterized, principally, in that the cup carrier comprises, either a recess with a shower for prepackaged cakes of coffee, or a removable packer with a shower, of a shape suitable to those of the filters for ground coffee, whose upper portion matches the shape of the recess which remains in the cup carrier; in that the filter-carrying cup can be provided as desired either with a filter for ground coffee or with a filter adapter supporting a filter for cakes of coffee, in that, in the second case, the filter-carrying cup is fixed by its base in bezel, articulated relative to one of the shouldered axles, whose clearance is limited by an abutment fixed below the other shouldered axle, in that said articulated bezel comprises, on its upper side, an ejection finger located such that during pivoting of the articulated bezel, its upper end describes an arc of a circle passing through the space for the cake of coffee, in that the cup joint comprises, in the prolongation of its external surface and toward its center, a tapered annular lip, of an internal diameter slightly less than the external diameter of the prepackaged cake of coffee.

According to one embodiment, the adapter is constituted by a cup of truncated conical shape, axially perforated, bearing on a rim provided for this purpose in the filter-carrying cup, whose upper surface comprises a recess delimited radially by an annular edge of a diameter and cross section corresponding to that provided at the periphery of the cake-bearing filter and matching the form of the latter.

For purposes of sealing, the mean diameter of the annular edge, provided on the upper surface of the cup and on the periphery of the filter-carrying cup, is greater than the internal diameter of the cup joint.

The abutment limiting the clearance of the articulated bezel, in which is received the base of the filter-carrying cup, comprises a flat portion, parallel to the plane passing through the shouldered axles. The articulated bezel bears on this flat surface of the abutment, via a tongue to which it is fixed.

According to one embodiment, the tongue is retained and urged against the abutment by a magnet received in the tongue or the flat surface of the abutment. In the first case, the abutment is made of metallic metal.

The ejection finger of the cake of coffee, after infusion, is fixed on the upper surface of the articulated bezel, beyond the radius of gyration of the helicoidal projections of the filter cup, at a distance from the axis of articulation of the bezel greater than that separating said axis from the edge of the prepackaged cake of coffee.

To facilitate loosening the edge of the cup, after infusion, the height of the ejection finger is determined such that the upper end of the latter must be received in a plane parallel to the external surface of the joint of the cup located just a little below this latter.

The advantages obtained, thanks to this invention, consist essentially in that the coffee making machine may be rapidly and simply adapted to the use of ground coffee or prepackaged cakes of coffee, that the cake of coffee is easily emplaced, that the mechanical ejection of the infused cake of coffee avoids any risk of burning the user and that the combined displacement of the filter-carrying cup is obtained by a single movement applied to the handle.

BRIEF DESCRIPTION OF THE DRAWINGS

Other characteristics and advantages will become apparent from the description which follows of one embodiment of a coffee making machine according to the invention, given by way of non-limiting example with respect to the accompanying drawings.

FIGS. 3–8 show the operation of the device according to FIGS. 1 and 2 and its mechanical ejection system for the infused cakes of coffee.

Finally.

DETAILED DESCRIPTION OF THE INVENTION

Figure 1:
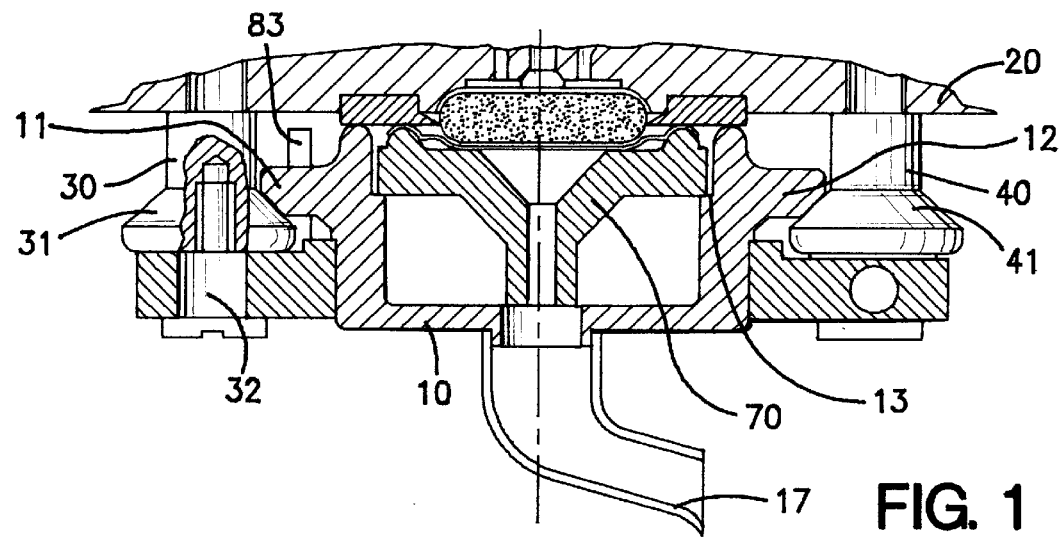
FIG. 1 is a front cross-sectional view of the device, adapted for prepackaged cakes of coffee.

The drawings show a device according to the invention permitting as desired the use, in a same coffee making machine, of ground coffee (FIG. 9) or prepackaged cakes of coffee (other figures), comprising a filter-carrying cup 10, a sleeve 16, provided with helicoidal lateral projections 11 and 12 adapted to bear on shoulders 31 and 41 of shouldered axles 30 and 40 fixed below the cup carrier 20.

Figure 12:
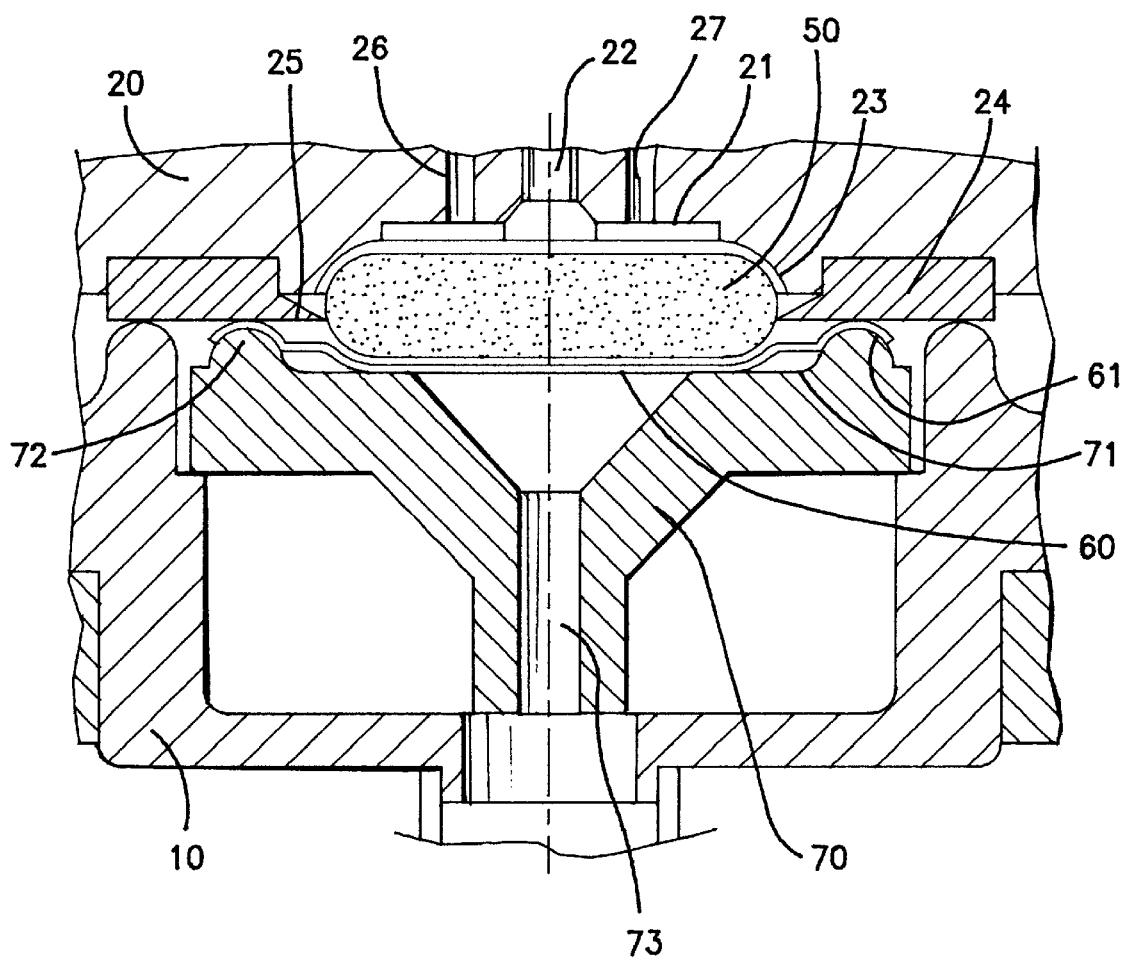
FIG. 12 shows a detailed enlarged cross-sectional view of the infusion chamber enclosing a prepackaged cake of coffee.
Figure 13:
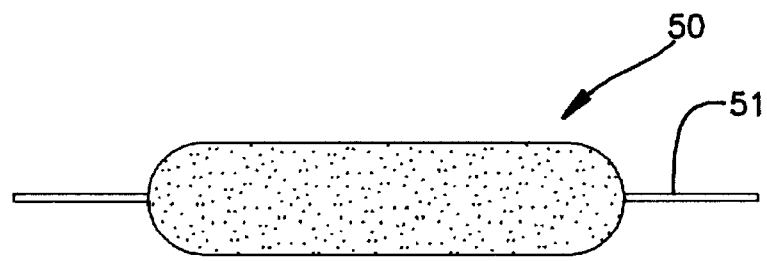
FIG. 13 shows in a cross-sectional view a cake of coffee used with one of the embodiments of the invention.

The cup carrier 20 is shown in FIG. 12 and is provided with a removable shower 21, fixed by a screw 22 in the bottom of a recess 23 reproducing the shape of a prepackaged cake of coffee 50, with an edge 51, disposed below the shower 21 and a metallic filter 60, with an annular edge 61, matching the shape of the cake of coffee 50 which it supports, received on the annular edge 72 of a dish 70 with a recess 71, resting on the internal rim 13 of the filter-carrying cup.

Figure 11:
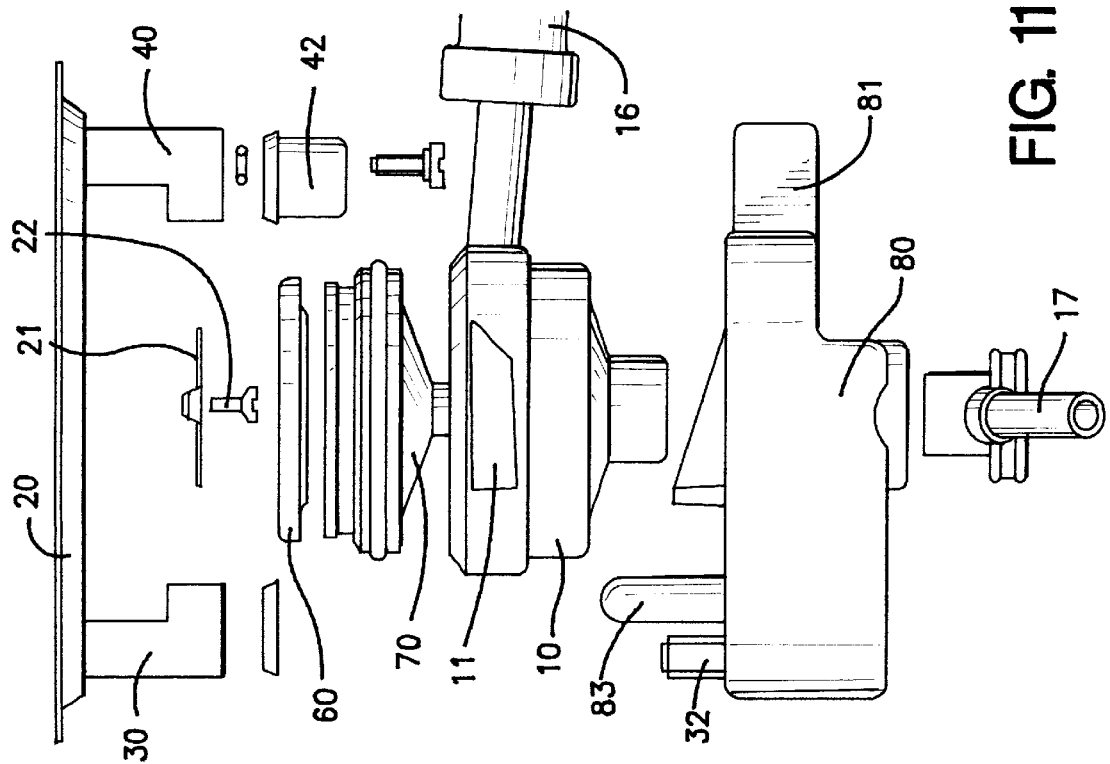
FIG. 11 is a side view of the device according to the invention, the assembly of its constituent pieces being shown in an exploded view.

The filter-carrying cup 10 is received by its base within a bezel 80 articulated relative to a screw 32, see FIGS. 1 and 11, mounted below the left shouldered axle 30 and bearing at the end of its movement, by means of a tongue 81, against an abutment 42 with a flat 43, fixed below the right shouldered axle 40; said tongue 81 comprising a magnet 82, directed toward the flat 43 of the abutment 42, and said bezel 80 being provided with an ejection finger 83 for the infused cake of coffee retained by the tapered lip 25 of the cup joint 24 fixed below the cup carrier 20.

Figure 2:
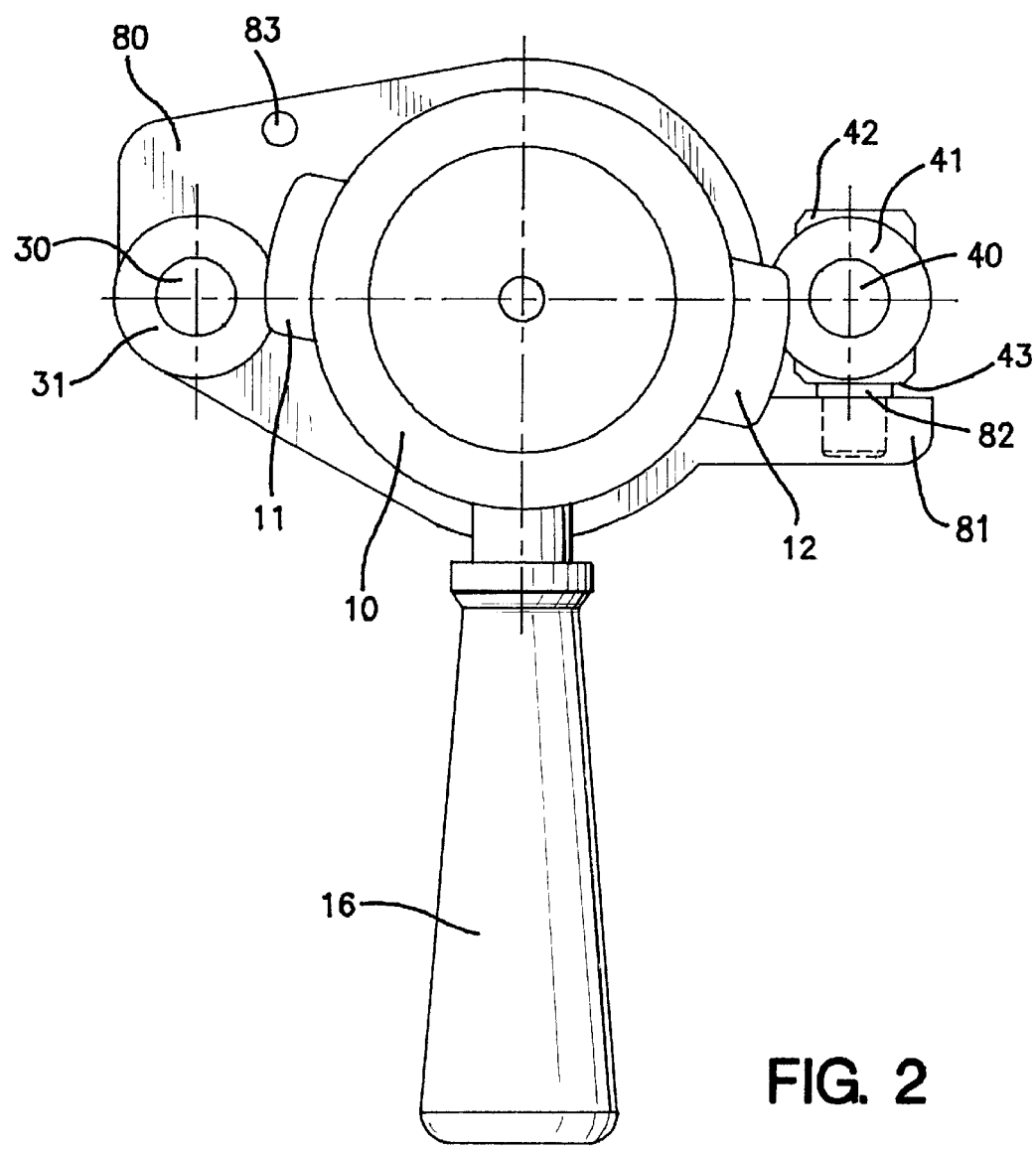
FIG. 2 is a top plan view of the device according to FIG. 1.
Figure 10:
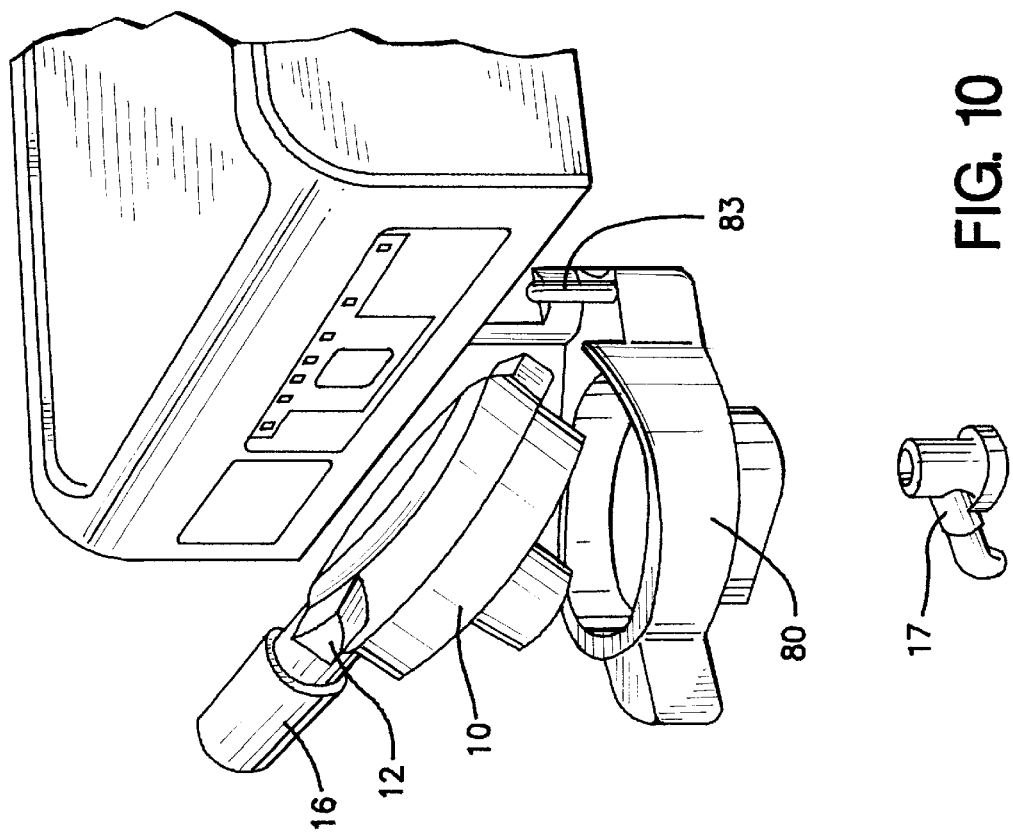
FIG. 10 shows a fragmentary perspective view of a coffee making machine provided with the device according to the present invention, during emplacement of the filter-carrying cup on the articulated bezel.

Examining now in greater detail FIGS. 1 and 2, it will be noted that the filter-carrying cup 10, given its reception in the bezel 80 articulated relative to the left shouldered axle 30, as is shown in FIG. 10, is thus perfectly maintained and presented during its engagement below the cup carrier 20, with a precise position, at the end of its movement, along the axis of the cup carrier 20, following contact of the tongue 81 against the abutment 42 fixed below the right shouldered axle 40; this presentation being effected by action on the sleeve 16 of the filter-carrying cup 10, it suffices to maintain and to increase the force exerted on the sleeve 16 to the right to obtain the progressive engagement of the helicoidal projections 11 and 12 on the shoulders 31 and 41 of the shouldered axles 30 and 40, causing the sliding upwardly of the filter-carrying cup 10, relative to the articulated bezel 80, giving rise at the end of the movement to blocking of the cake of coffee 50 between the shower 21 of the cup carrier and the metallic filter supporting the cake 60, as well as the pinching of the cup joint 24 by the annular edge 61 of the metallic filter 60 and the lateral tightening of the cake of coffee 50 by the tapered lip 25 of the cup joint 24, received in the base of the cup carrier 20.

The seal being thus ensured, infusion can begin by ejection of water at a suitable temperature through the conduits 26 and 27 of the cup carrier 20 opening above the shower 21: water which will thus be forced through the cake of coffee 50, ultimately to flow through the axial opening 73 of the dish 70, then into the distributing nozzle 17 located below the filter-carrying cup 10.

The infusion being completed, it suffices, to obtain the disengagement of the cake of coffee 50 and the return into initial position of the filter-carrying cup 10, to exert a force to the left, on the sleeve 16 of this latter to obtain first of all the return of the latter into the bezel 80 and the disengagement of the cake of coffee 50 which remains retained by the tapered lip 25 of the cup joint 24; the filter-carrying cup 10 again resting against the upper surface of the bezel 80, it suffices to exert a longitudinal action on the sleeve 16 to overcome the attractive force exerted by the magnet 82 on the abutment 42 and to obtain the forward pivoting of the bezel 80, whose ejection finger 83, during its movement, comes into contact with the edge 51 of the cake 50, which it loosens by exerting an action which causes the latter to fall into a receptacle (not shown), located below the device, then, in the interval, the rear edge of the bezel 80 separates from and passes beyond a vertical from the cup carrier 20.

Referring now to FIGS. 3 to 8, showing the operation of the device, it will be noted that, as has already been explained above, the cake 50 is first placed on the metallic filter 60, located in the lower portion of the filter-carrying cup 10 (FIGS. 3 and 4), and movement toward the right is exerted on the sleeve 16 of said cup, until the tongue 81 comes into contact against the abutment 42 (FIG. 5). The action on the sleeve 16 is then continued and intensified to obtain the blocking of the cake 50 in the recess of the cup carrier 20 (FIG. 6). To obtain the disengagement of the filter-carrying cup 10, then the mechanical ejection of the cake of coffee 50, it suffices to exert on the sleeve 16, an action in the reverse direction, to obtain the disengagement of the cake of coffee 50 (FIG. 7) then the ejection of said cake under the action of the finger 83 (FIG. 8).

Figure 9:
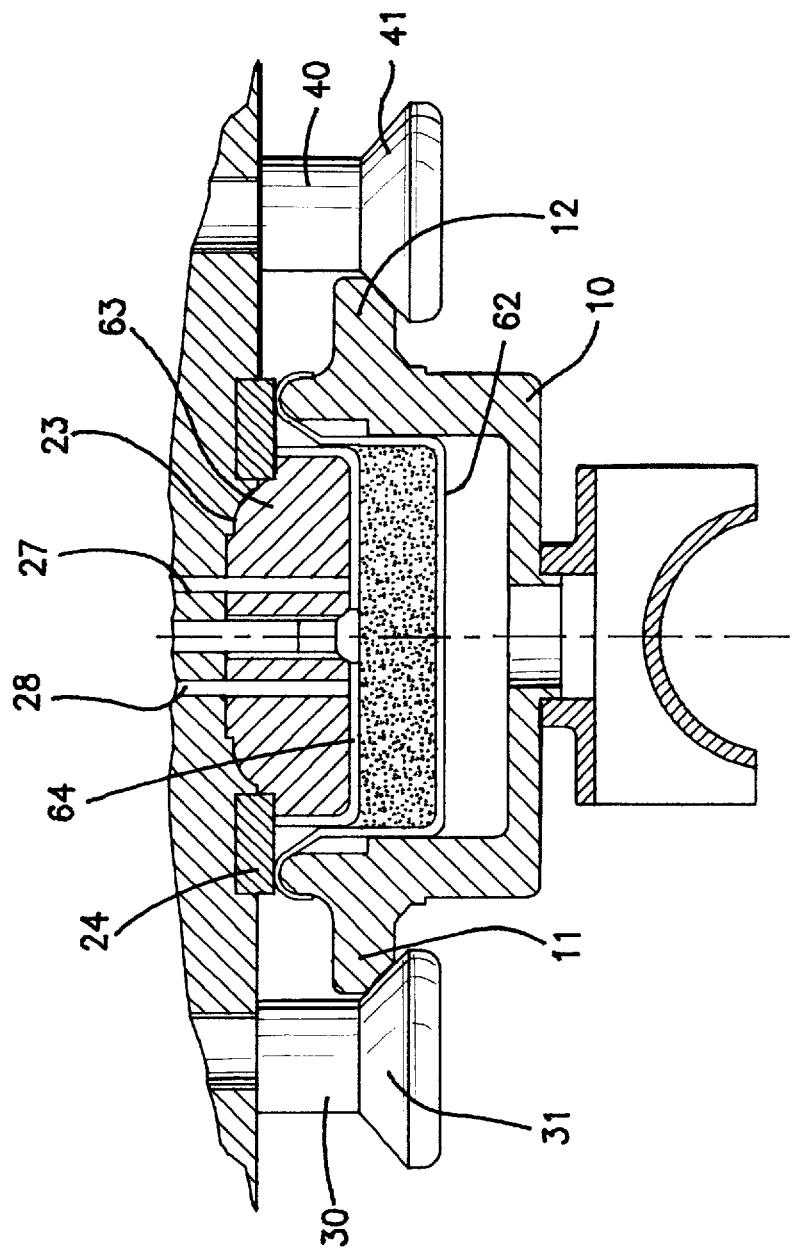
FIG. 9 is a front cross-sectional view of the device adapted for ground coffee.

Finally, referring to FIG. 9, it will be noted that, to use ground coffee, it suffices first to withdraw the metallic cake-carrying filter 60 and the dish 70 of the filter-carrying cup 10 and the replace them by a conventional cylindrical filter 62, then to withdraw the shower 21 and to replace it with a packer 63, with a shower 64, whose upper portion matches the shape of the recess 23 for prepackaged coffee cakes 50. The device then functions according to French patent application No. 95/01961.

It will be noted that, no matter what the selected version, the adaptation of the machine is simple and within the skill of the user, because the only tool needed is a simple screwdriver.

The operation of the device is shown in FIGS. 3 to 8.

In FIG. 3, the bezel 80 is in offset position relative to the cup carrier 20 on which are present the shouldered axles 30 and 40. This arrangement facilitates the emplacement of the filter-carrying cup 10 relative to said bezel 80.

In FIG. 4, it is easily seen that in this position, identical to that of FIG. 3, it is very easy to emplace the prepackaged cake of coffee 50 above the dish 70 contained in this filter-carrying cup 10.

In FIG. 5, the assembly constituted by the bezel 80, the filter-carrying cup 10 and the cake 50 can be moved rotatably in the direction F3, about the left shouldered axle 30, until the tongue 80 comes into contact with the abutment 42 and is immobilized in this position by means of its magnet 82. At this time, said cup 10 is located below and relative to the cup carrier 20 and the lateral helicoidal projections 11 and 12 are in contact with the shoulders 31 and 41.

In FIG. 6, the gripping according to F1 of the filter-carrying cup 10 against said cup carrier 20 to permit the infusion, takes place by a simple displacement of the sleeve 16 of the cup 10.

In FIG. 7, the ungripping according to F2 is a reverse movement to that described in FIG. 6.

Similarly, and according to FIG. 8, rotation according to F4 is a reverse movement of that described in FIG. 5.

The object of the invention is hence to facilitate the positioning of the filter-carrying cup 10 below the cup carrier 20 and the gripping and ungripping to permit infusion.

We claim:

1. Device permitting using as desired, in a coffee making machine, ground coffee in a first mode of operation, and prepackaged cakes of coffee in a second mode of operation, the device comprising:

a filter-carrying cup fixed below a cup carrier by means of a bayonet system constituted by helicoidal projections, diametrically opposed, located on the sides of the filter-carrying cup, and shouldered axles fixed below the cup carrier, said cup carrier comprising a recess having a recess configuration suitable for said ground coffee and also suitable for said prepackaged cakes of coffee;

said recess coacting with a removable packer and with a shower, and said cup being provided with a ground coffee supporting filter for said ground coffee, in said first mode; and said recess coacting with a shower, and said cup being provided with a cake-carrying filter, and with an adaptor for prepackaged cakes of coffee, in said second mode.

2. Device according to claim 1, further comprising a bezel articulated relative to one of the shouldered axles, and having a clearance which is limited by an abutment fixed below the other shouldered axle, said articulated bezel structured and arranged to receive a base of the filter-carrying cup.

3. The device according to claim 2, further comprising an ejection finger positioned in an upper surface of the articulated bezel, such that during pivoting of said articulated bezel, an upper end of said ejection finger describes an arc of a circle passing through the recess.

4. The device according to claim 1, wherein the cup carrier is provided with an annular cup joint having extending from its inner surface an annular tapered lip which extends in prolongation towards its center, said annular tapered lip having an internal diameter slightly less than the external diameter of the prepackaged cake of coffee.

5. The device according to claim 1, wherein the adaptor for prepackaged cakes of coffee is constituted by a dish of truncated conical shape, axially perforated, bearing against a rim provided in the filter-carrying cup, said dish having an upper surface which comprises a recess delimited radially by an annular edge, of a diameter and cross-section corresponding to that provided at the periphery of the cake-carrying filter, matching the shape of the latter.

6. The device according to claim 5, wherein the mean diameter of the annular edge, provided in the upper surface of the dish and at the periphery of the cake-carrying filter, is greater than the internal diameter of the cup joint.

7. The device according to claim 2, wherein the abutment limiting the clearance of the articulated bezel in which is received the base of the filter cup comprises a flat, which is parallel to a plane passing through the shouldered axles.

8. The device according to claim 2, further comprising a tongue secured to the articulated bezel, said tongue bearing on the flat thereby limiting the clearance of the articulated bezel.

9. The device according to claim 8, wherein the tongue is retained temporarily against the surface bearing the abutment by a magnet.

10. The device according to claim 9, wherein the magnet is received in the tongue.

11. The device according to claim 2, wherein the abutment is provided in a magnetic metal.

12. The device according to claim 3, wherein the ejection finger of the infused cake of coffee is disposed beyond a radius of gyration of the helicoidal projections of the filter-carrying cup, at a distance from the axis of articulation of the bezel greater than that separating said axis from the edge of the prepackaged cake of coffee.

13. The device according to claim 3, wherein the height of the ejection finger is determined such that its upper end will lie in a plane parallel to the external surface of the cup joint located just below the latter.

* * * * *